United States Patent
Lin et al.

(10) Patent No.: US 9,960,912 B2
(45) Date of Patent: May 1, 2018

(54) KEY MANAGEMENT FOR A RACK SERVER SYSTEM

(71) Applicant: Quanta Computer Inc., Taoyuan (TW)

(72) Inventors: Tsung-Wei Lin, Taoyuan (TW); Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 328 days.

(21) Appl. No.: 14/791,655

(22) Filed: Jul. 6, 2015

(65) Prior Publication Data
US 2017/0012770 A1    Jan. 12, 2017

(51) Int. Cl.
*H04L 9/08* (2006.01)
*G06F 21/57* (2013.01)

(52) U.S. Cl.
CPC ............ *H04L 9/083* (2013.01); *G06F 21/572* (2013.01); *H04L 9/088* (2013.01); *H04L 9/0891* (2013.01); *G06F 2221/033* (2013.01)

(58) Field of Classification Search
CPC ....... H04L 9/083; H04L 9/088; H04L 9/0891; H04L 9/08; H04L 9/30; H04L 63/145; H04L 63/1416; G06F 21/572; G06F 2221/033; G06F 21/72; G06F 21/10
See application file for complete search history.

(56) References Cited

U.S. PATENT DOCUMENTS

| | | | | |
|---|---|---|---|---|
| 2009/0063662 | A1* | 3/2009 | Baker | H04L 41/0806 709/220 |
| 2010/0111309 | A1* | 5/2010 | Khatri | G06F 21/602 380/283 |
| 2011/0258110 | A1* | 10/2011 | Antoci | G06F 1/266 705/39 |
| 2015/0089221 | A1* | 3/2015 | Taylor | H04W 12/08 713/168 |
| 2015/0193620 | A1* | 7/2015 | Khatri | G06F 21/575 713/2 |

OTHER PUBLICATIONS

"Unified Extensible Firmware Interface Specification", Apr. 2015, Unified EFI, Inc., http://www.uefi.org/sites/default/files/resources/UEFI%202_5.pdf, pp. 1-2588.*

* cited by examiner

*Primary Examiner* — Ali Abyaneh
(74) *Attorney, Agent, or Firm* — Nixon Peabody LLP; Eduardo J. Quinones; Zhou Lu

(57) ABSTRACT

A system and method for providing security key exchange and management prior to the operating system of the server and also provides for executing various security functions to prevent a virus or malicious software from propagating through the server and the network. The system and method utilize the BIOS firmware and baseboard management controller (BMC), which are more secure since they do not rely on open source code for software plug-ins from the user layer. As a result, a secure code can be created for key management with a globally unique identifier (GUID). The system and method provides for a network manager to easily and flexibly manage multiple security keys for a rack server system.

20 Claims, 8 Drawing Sheets

KEY MANAGEMENT FOR A RACK SERVER SYSTEM

TECHNICAL FIELD

Embodiments of the system and method generally related to rack server systems. More specifically, embodiments of the system and method generally related to key management for rack server systems.

BACKGROUND

Secure data is an important characteristic for a computer network. There are many methods to provide security that can be employed to protect data stored on the computer network. Some of these methods include encryption and decryption to protect important data using hardware and software. Additional methods are employed on the computer network server which is applied to the operating system, the motherboard, basic input/output system (BIOS), security controllers, secure storage and secure processors. Typically, each of these security features may involve a security key to establish a trust relationship. For example, a trust relationship can exist between the platform owner and the platform firmware, operating system and platform firmware, client and server platform, secure data of media and platform owner, etc. Establishing the trust relationship can be accomplished using symmetric and asymmetric cryptographic keys, digital signature certificates, and new objects to enroll/delete/clear key. A secure key of each of the security features above all has its own capability, and a unique name and special location to save/retrieve, to protect the server platform from malicious software attack. Each one of these security features also has different characteristics, policy and software protocols for data, message, and owner authentication.

In order to manage these different kinds of security keys more efficiently for a rack server system, a key management server can be used to centralize security keys for multiple rack servers in a data center. The key management server can deliver the appropriate security keys to the rack servers. The server platform can communicate with the key management server using a secure protocol or secure firmware and hardware when under attack by a virus or malicious software. One communication protocol is the key management interoperability protocol (KMIP) which can be used between the key management server and an encryption server, but typically only executes under the operating system layer. Unfortunately, a malicious software application may reside behind the operating system kernel and retrieve a security key with false certification, then use the security key to enter the server and cause damage.

SUMMARY

Systems and methods in accordance with various embodiments of the present technology provide a solution to the above-mentioned problems by providing key management for a rack server system. More specifically, various embodiments of the present technology provide a system and method for providing security key exchange and management prior to the loading of the operating system (OS) of the server. By establishing security key exchange and management prior to the loading of the OS, the present technology avoids security issues that are present where the security key exchange and management occurs after the loading of the OS. In those situations, viruses and/or malicious software can enter the system using the OS and cause damage to the entire network. Since the OS is not used for security key exchange and management, components that operate prior to the OS loading are used. These components are the BIOS firmware and/or baseboard management controller (BMC), which are both more secure than the OS since they do not rely on open source code for software plug-ins from the user layer. As a result, a secure code can be created for key management with a globally unique identifier (GUID). The system and method provides for a network manager to easily and flexibly manage multiple security keys for a rack server system.

In one embodiment, a security key is delivered by enclosed firmware within the computer without exposure to viruses or malicious software. The enclosed firmware includes a unified extensible firmware interface (UEFI) BIOS and/or BMC firmware, as both of these are enclosed source code within the server motherboard that does not allow for external plug-in application loading after production or manufacture. As a result, the UEFI BIOS and/or BMC are both reliable, trustworthy, and secure programs to process security key exchange and management for various security features.

In one embodiment, a security key request is submitted through a self-encrypted drive (SED). A SED is a self-encrypting hard drive with a circuit built into the disk drive controller chip that encrypts all data to the magnetic media and decrypts all the data from the media automatically. All SEDs encrypt all the time from the factory onwards, performing like any other hard drive, with the encryption being completely transparent or invisible to the user. The SED requests, using a key management service (KMS) protocol, a security key. The KMS can be integrated with the UEFI BIOS. The UEFI BIOS is protected from malicious software and/or viruses, so only the security key request is routed through the KMS using a protocol to the intelligent platform management interface (IPMI) on the BMC. The BMC uses another protocol, the key management interoperability protocol (KMIP), to contact the key management server via a network. As with the UEFI BIOS, the BMC is also protected from malicious software and/or viruses, so only the security key request is routed through the KMIP to the key management server (KMS). The KMS provides the security key via a network through the KMIP protocol to the BMC. The BMC uses the IPMI protocol to send the security key to the UEFI BIOS. The UEFI BIOS send the security key to the SED.

In one embodiment, the SED submits a security key request to the UEFI BIOS using the KMS protocol. The UEFI BIOS, protected from malicious software and/or viruses, contacts the KMS via the network. The KMS provides the security key via the network to the UEFI BIOS using the KMIP protocol. The UEFI BIOS sends the security key to the SED using the KMS protocol.

In one embodiment, a valid security key request is submitted to the UEFI BIOS using the KMS protocol. The UEFI BIOS, protected from malicious software and/or viruses, contacts the KMS via the network. The KMS determines that the security key request is valid; however the security key is not available on the KMS. The KMS creates a security key and provides the security key via the network to the UEFI BIOS using the KMIP protocol. The UEFI BIOS sends the security key to the security key requestor using the KMS protocol.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various embodiments of the present technology provide a system and method for providing key management for a rack server system. More specifically, various embodiments of the present technology provide a system and method for providing robust key exchange and management prior to the operating system of the server and also provides for executing various security functions to prevent a virus or malicious software from propagating through the server and the network. The system and method utilize the BIOS firmware and baseboard management controller (BMC), which are more secure since they do not rely on open source code for software plug-ins from the user layer. As a result, a secure code can be created for key management with a globally unique identifier (GUID). The system and method provides a network manager to easily and flexibly manage multiple security keys for a rack server system.

Figure 1:
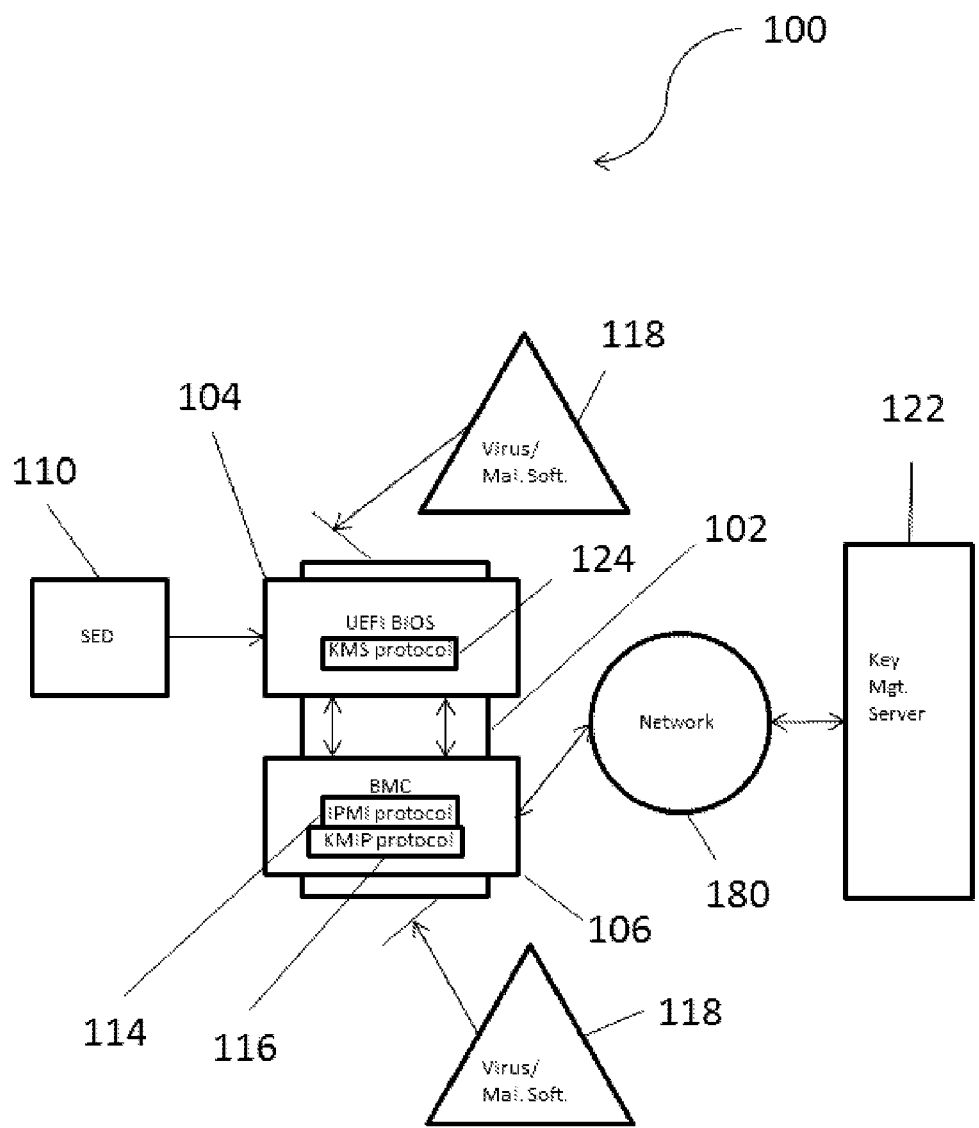
FIG. 1 illustrates a schematic block diagram of an exemplary key management for a rack server system in accordance with an implementation of the present technology.

FIG. 1 illustrates a schematic block diagram of an exemplary key management for a rack server system in accordance with an implementation of the present technology. In this example, the system 100 includes at least one rack server 102 containing a UEFI BIOS 104 and a BMC 106. The UEFI BIOS 104 includes a KMS protocol 124 for communicating with SED 110. The BMC 106 includes a KMIP protocol 116 and an IPMI protocol 114. The SED 110 submits a security key request using the KMS protocol 124 of the UEFI BIOS 102. The BMC 106 includes a KMIP protocol 116 that contacts a KMS 122 via a network 180. As described above, the UEFI BIOS 104 and the BMC 106 are secure from viruses and/or malicious software 118. The KMS 122 provides the security key (not shown) electronically via the network 180 to the BMC 102 using the KMIP protocol 116.

Figure 2:
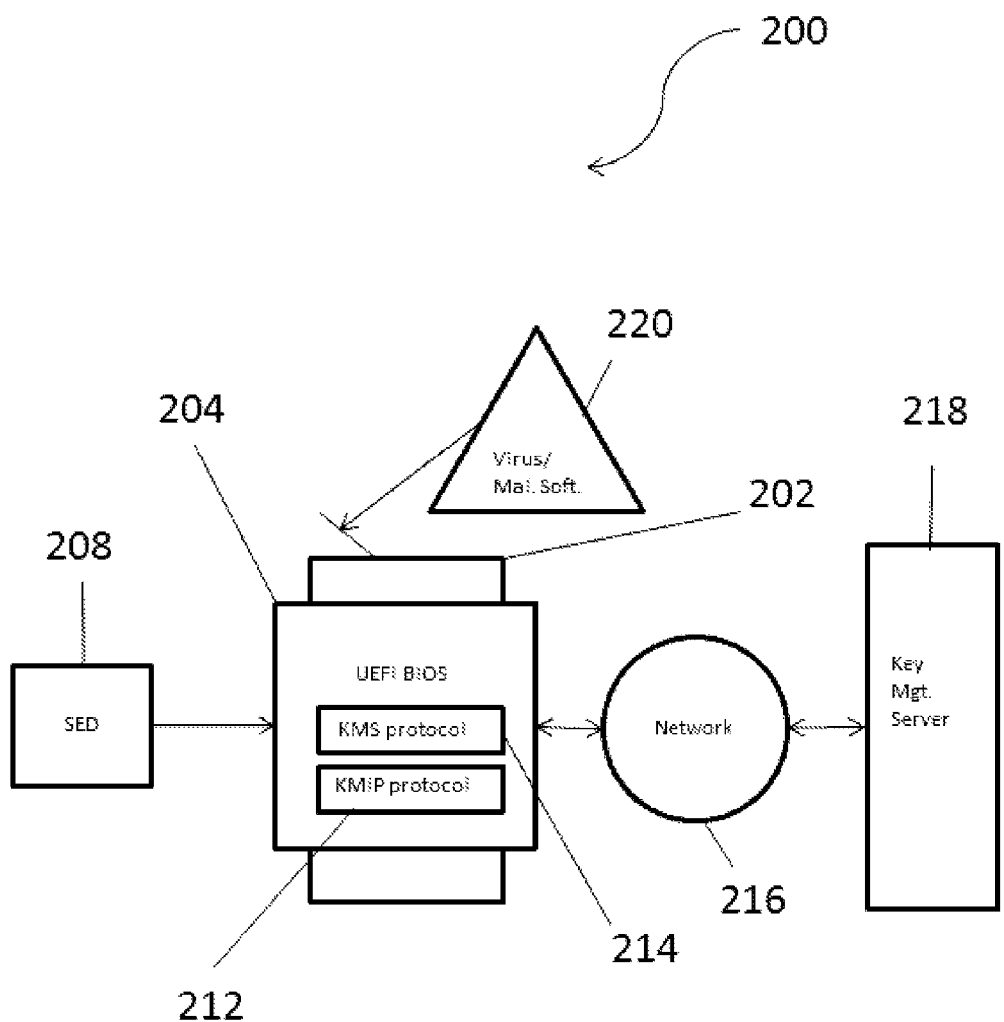
FIG. 2 is an exemplary diagram of an exemplary key management for a rack server system in accordance with an implementation of the present technology.

FIG. 2 illustrates a schematic block diagram of an exemplary key management for a rack server system in accordance with an implementation of the present technology. In this example, the system 200 includes at least one rack server 202 containing a UEFI BIOS 204. The UEFI BIOS 204 includes a KMIP protocol 212 and a KMS protocol 214 for receiving security key requests submitted by the SED 208. The UEFI BIOS 204, as described above, is secure from viruses and/or malicious software 220. The security key request is sent via a network 216 to a KMS 218. The KMS 218 sends the security key via the network 216 to the UEFI BIOS 204 using the KMIP protocol 212. The security key is then sent to the SED 208 via KMS protocol 214.

Figure 3:
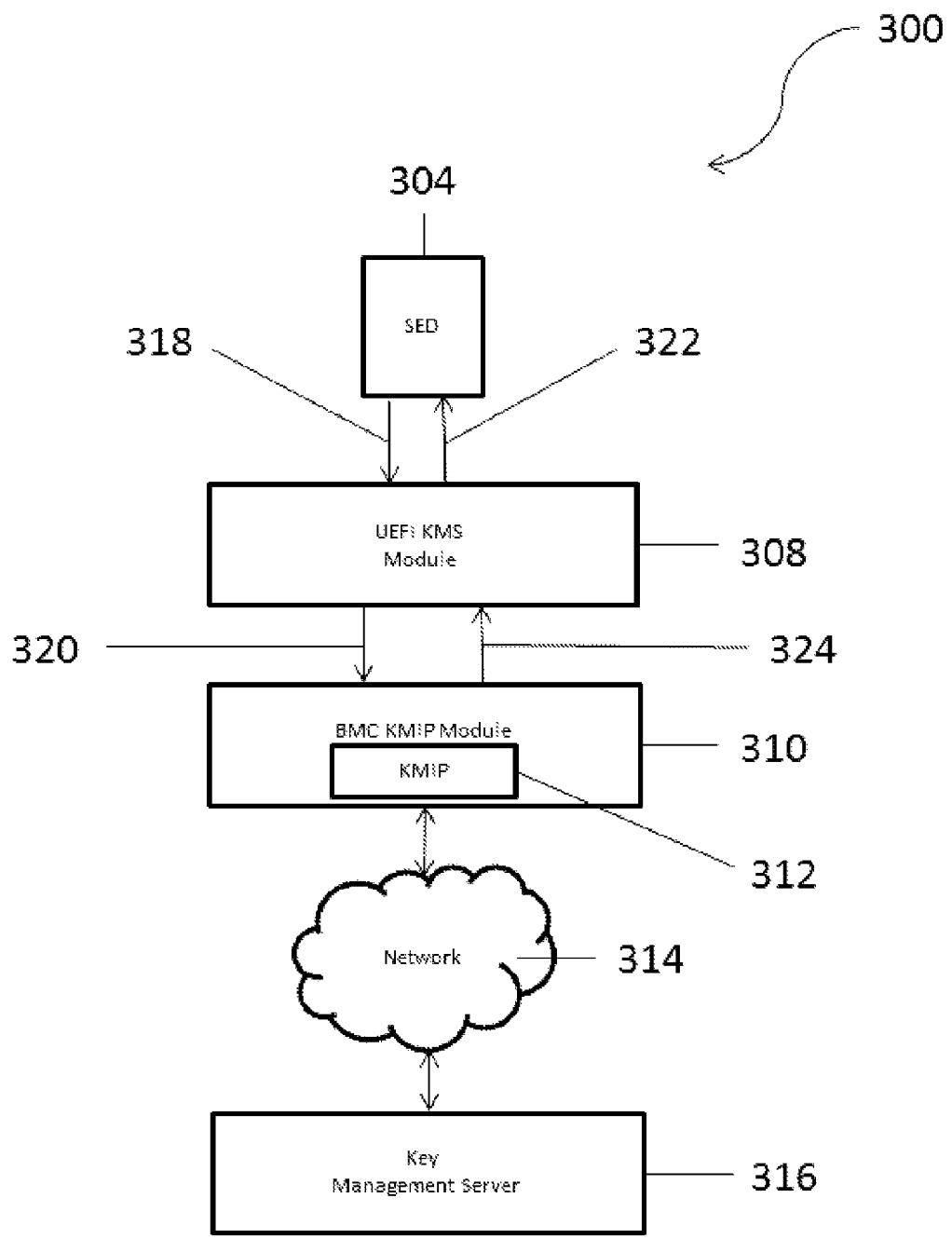
FIG. 3 is an exemplary diagram of an exemplary key management for a rack server system in accordance with an implementation of the present technology.

FIG. 3 illustrates a schematic block diagram of an exemplary key management for a rack server system in accordance with an implementation of the present technology. In this example, the system 300 includes a variety of security requesting devices, such as a SED 304. The SED 304 submits a security key request 318 through a UEFI BIOS module 308. The security key request 320 is sent to a BMC 310. A KMIP 312 sends the security key request 320 via a network 314 to a KMS 316. The KMS 316 provides a security key 324 which is sent via the network 314 through the KMIP 312 to the BMC 310. The security key 324 is sent to the UEFI BIOS module 308. The UEFI BIOS module 308 sends the security key 322 to a variety of security requesting devices, such as the SED 304.

The UEFI BIOS module 308 includes an EFI_KEY_MANAGEMENT_SERVICE_ PROTOCOL that enables a device driver and security feature software (not shown) to access security keys associated with their operation. For example, a storage device driver may require a set of one or more security keys to access managed areas on the storage device. Implementation of the UEFI BIOS module 308 includes a response for the security key request from a device firmware, operating system and UEFI security feature. A variety of commands can be sent to the KMS including "UEFI driver". A "UEFI driver" request is for a new UEFI driver to install EFI_KMS_SERVICE_PROTOCOL during power on start-test (POST). A "KMS protocol" request can apply for a variety of situations, including EFI_KMS_PROTOCOL.GetServiceStatus( ), which obtains the current status of the KMS. Another situation is EFI_KMS_PROTOCOL.CreateKey( ), which requests that the KMS generate one or more new security keys and associate them with security key identifiers. The security key value is returned to the requestor. Another situation is EFI_KMS_PROTOCOL.GetKey( ), which requests an existing security key on the KMS.

The KMIP protocol 312 is used for communication between requestors and servers to perform a variety of management operations on objects stored and maintained by a key management system. Implementing the BMC key management interoperability (KMIP) protocol module 312 includes providing a web user interface for a user to configure the KMS 316 uniform resource locator (URL), user name, and password. Also provided is a response for the security key request from the UEFI BIOS 308 by using an OEM IPMI command, such as "Get KMIP Parameters/String" which is used for retrieving the configuration parameters and returned KMIP string from the "Set KMIP Parameters/String" command and KMIP server, respectively. Another OEM IPMI command can be "Set KMIP Parameters/String" which is used for setting the configuration parameters and KMIP string. Also provided is retrieving a security key via the BMC 310 and then translating the security key to the system firmware, operating system and the UEFI security feature (not shown).

Implementing the BMC key management interoperability (KMIP) protocol module 312 also includes implementing KMIP operations of create and locate between a rack server and the KMS 316. These implementation commands include "Register( )", which requests the rack server to register a managed object that was created by the user or obtained by the user through some other means, allowing the rack server to manage the object; "Locate( )", which requests that the rack server search for one or more managed objects; or "Create( )", which requests the rack server to generate a new symmetric security key as a managed secured object. Also implementing the BMC KMIP protocol 312 can include locating and creating a security key with the system GUID.

Figure 4:
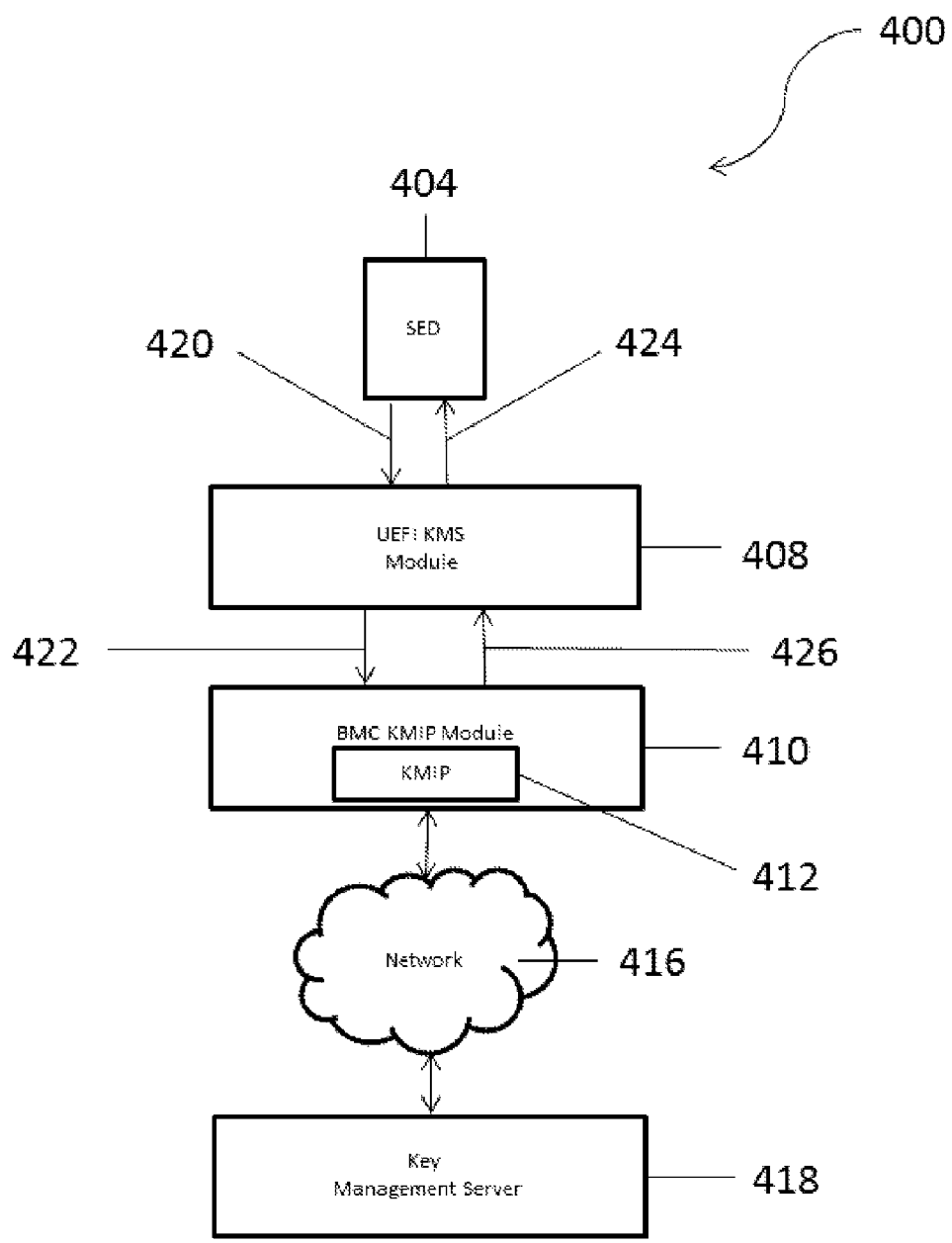
FIG. 4 is an exemplary diagram of an exemplary key management for a rack server system in accordance with an implementation of the present technology.

FIG. 4 illustrates a schematic block diagram of an exemplary key management for a rack server system in accordance with an implementation of the present technology. In this example, the system 400 includes a variety of security requesting devices, such as the SED 404. The SED 404 submits a security key request 420 through a UEFI BIOS module 408. The security key request 422 is sent to a BMC 410 using a mail box, such as a text-based communication service. A KMIP 412 sends the security key request 422 through the KMIP 412 via a network 416 to a KMS 418. The KMS 418 provides a security key 426 which is sent via the network 416 through the KMIP 412 to the BMC 410. The UEFI BIOS module 408 sends the security key 422 to a variety of security requesting devices, such as the SED 404.

The UEFI BIOS module 408 includes an EFI_KEY_MANAGEMENT_SERVICE_ PROTOCOL that enables a device driver and security feature software (not shown) to access security keys associated with their operation. For example, a storage device driver may require a set of one or more security keys to access managed areas on the storage device. Implementation of the UEFI BIOS module 408 includes a response for the security key request from a device firmware, operating system and UEFI security feature. A variety of commands can be sent to the KMS including "UEFI driver". A "UEFI driver" request is for a new UEFI driver to install EFI_KMS_SERVICE_PROTOCOL during power on start-test (POST). A "KMS protocol" request can apply for a variety of situations, including EFI_KMS_PROTOCOL.GetServiceStatus( ), which obtains the current status of the KMS. Another situation is EFI_KMS_PROTOCOL.CreateKey( ), which requests that the KMS generate one or more new security keys and associate them with security key identifiers. The security key value is returned to the requestor. Another situation is EFI_KMS_PROTOCOL.GetKey( ), which requests an existing security key on the KMS.

The KMIP protocol 412 is used for communication between requestors and servers to perform a variety of management operations on objects stored and maintained by a key management system. Implementing the BMC key management interoperability (KMIP) protocol module 412 includes providing a web user interface for a user to configure the KMS 418 uniform resource locator (URL), user name, and password. Also provided is a response for the security key request from the UEFI BIOS 408 by using an OEM IPMI command, such as "Get KMIP Parameters/String" which is used for retrieving the configuration parameters and returned KMIP string from the "Set KMIP Parameters/String" command and KMIP server, respectively. Another OEM IPMI command can be "Set KMIP Parameters/String" which is used for setting the configuration parameters and KMIP string. Also provided is retrieving a security key via the BMC 410 and then translating the security key to the system firmware, operating system and the UEFI security feature (not shown).

Implementing the BMC key management interoperability (KMIP) protocol module 412 also includes implementing KMIP operations of create and locate between a rack server and the KMS 418. These implementation commands include "Register( )", which requests the rack server to register a managed object that was created by the user or obtained by the user through some other means, allowing the rack server to manage the object; "Locate( )", which requests that the rack server search for one or more managed objects; or "Create( )", which requests the rack server to generate a new symmetric security key as a managed secured object. Also implementing the BMC KMIP protocol 412 can include locating and creating a security key with the system GUID.

Figure 5:
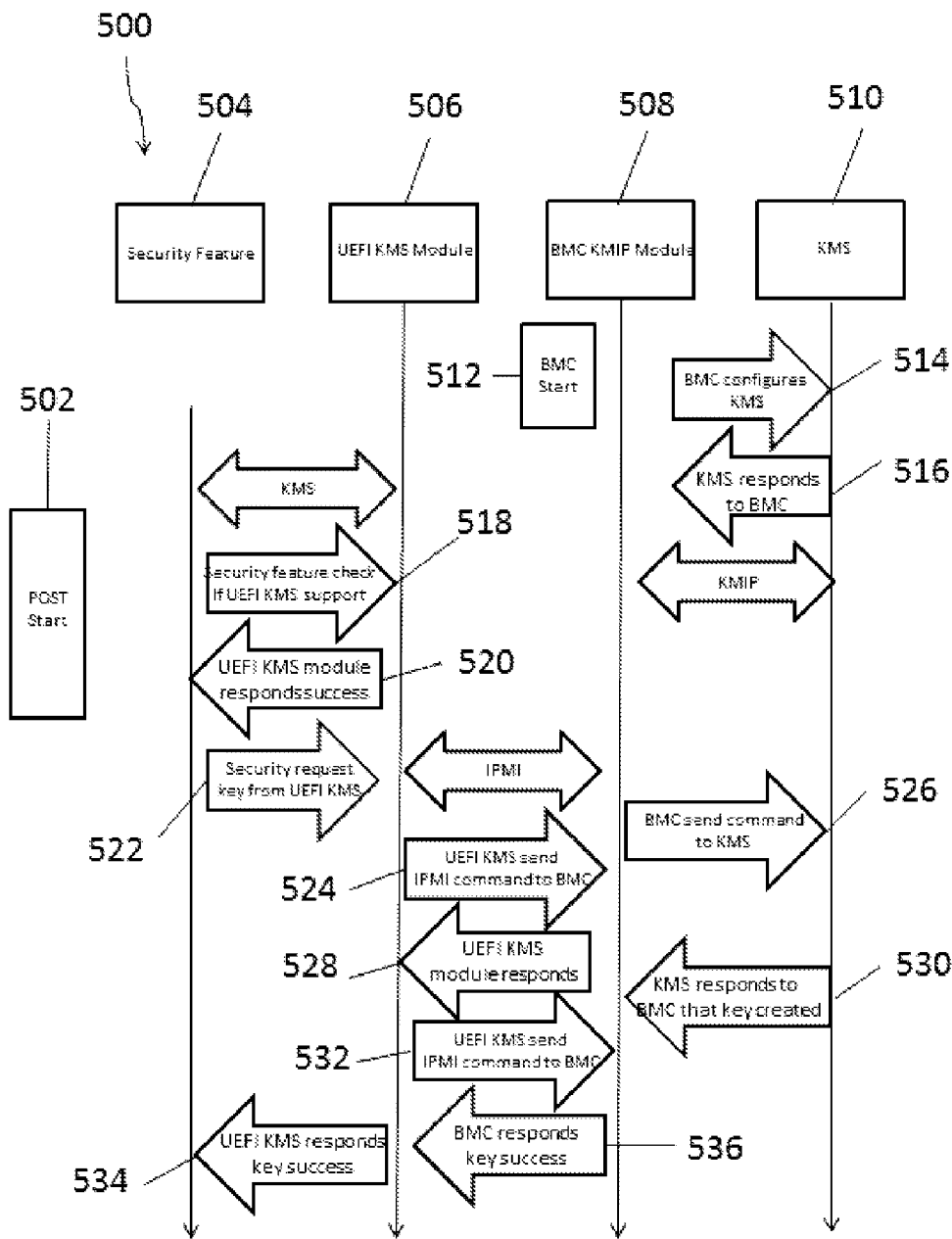
FIG. 5 is an exemplary diagram of a flow chart detailing between a security feature, UEFI KMS module, BMC KMIP module, and a key management server in accordance with an implementation of the present technology.

FIG. 5 illustrates a flow diagram of an exemplary key management for a rack server system 500 in accordance with an implementation of the present technology. The flow diagram includes a security feature 504, a UEFI KMS module 506, a BMC KMIP 508, a KMS 510. In step 514, using the KMIP protocol, the BMC 508 configures the KMS 510 URL, including a user name and password, through "Register( )". In step 516, the KMS 510 responds to the BMC 508 that the connection is successful. In step 518, using the KMS protocol, the security feature 504 determines whether system platform firmware supports UEFI KMS module 506 through "GetServiceStatus( )". In step 520, the UEFI KMS module 506 responds successfully. In step 522, the security feature requests a security key from the UEFI KMS module 506. Using the IPMI protocol, in step 524, the UEFI KMS module 506 sends an OEM IPMI command to the BMC 508 requesting a security key. The BMC 508 responds successfully with an "in progress" response. In step 532, the UEFI KMS module 506 polls until the security key is retrieved in the BMC 508. In Step 530, the KMS 510 responds to the BMC 508 that the security key has been created or retrieved. In step 536, the BMC 508 responds successfully with the security key. In step 534, the UEFI KMS module 506 responds successfully with the security key to the security feature 504.

Figure 6:
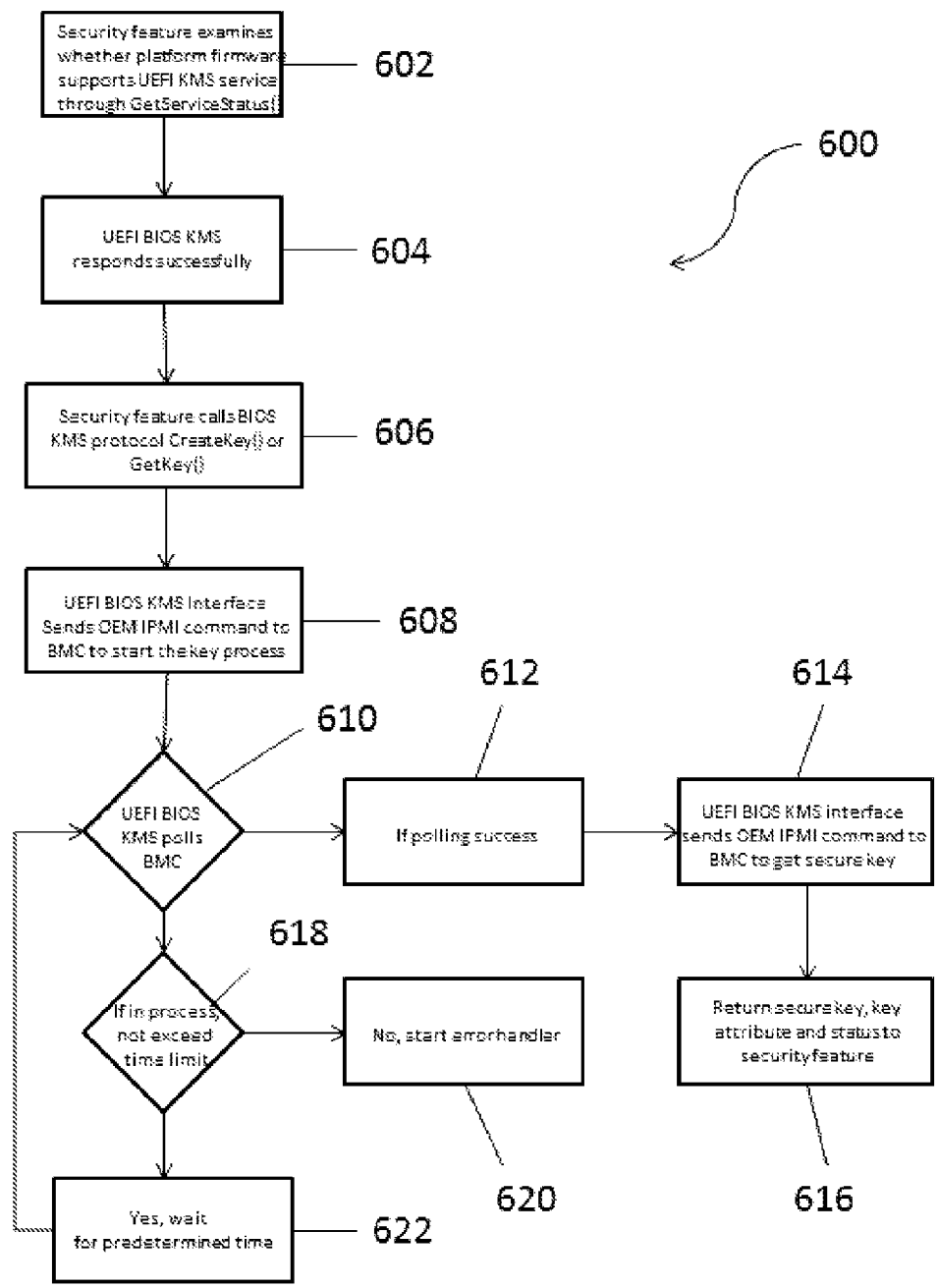
FIG. 6 is an exemplary diagram of a flow chart detailing the interaction between a security feature and a BMC KMIP module in accordance with an implementation of the present technology.

FIG. 6 illustrates a flow diagram of an exemplary key management for a rack server system 600 in accordance with an implementation of the present technology. In this example, the interaction between a UEFI BIOS KMS, a security feature, and a BMC KMIP module is detailed. In step 602, a security feature determines whether a system platform firmware supports the UEFI KMS service through "GetServiceStatus( )". In step 604, a UEFI BIOS KMS module responds successfully. In step 606, a security feature calls BIOS KMS protocol "CreateKey( )" or GetKey( )". In step 608, the UEFI BIOS KMS sends an OEM IPMI command to the BMC to start the security key process. In step 610, the UEFI BIOS KMS interface polls the BMC and check the process status. If the status is successful in step 612, the UEFI BIOS KMS interface 614 sends an OEM IPMI command to the BMC to retrieve the security key. In step 616, the security key, security key attributes, and the security key status is returned to the security feature. In step 618, if the status is not successful, an additional determination is made whether a time threshold has been exceeded, for example 1 minute. If the threshold has been exceeded, in step 620, an error handling mechanism is started. If the threshold has not been exceeded, in step 622, the process waits 1 second or another predetermined period, then returns to step 610. As detailed previously, either a security key will be obtained through steps 612, 614, and 616, or an error handling mechanism is started in step 620.

Figure 7:
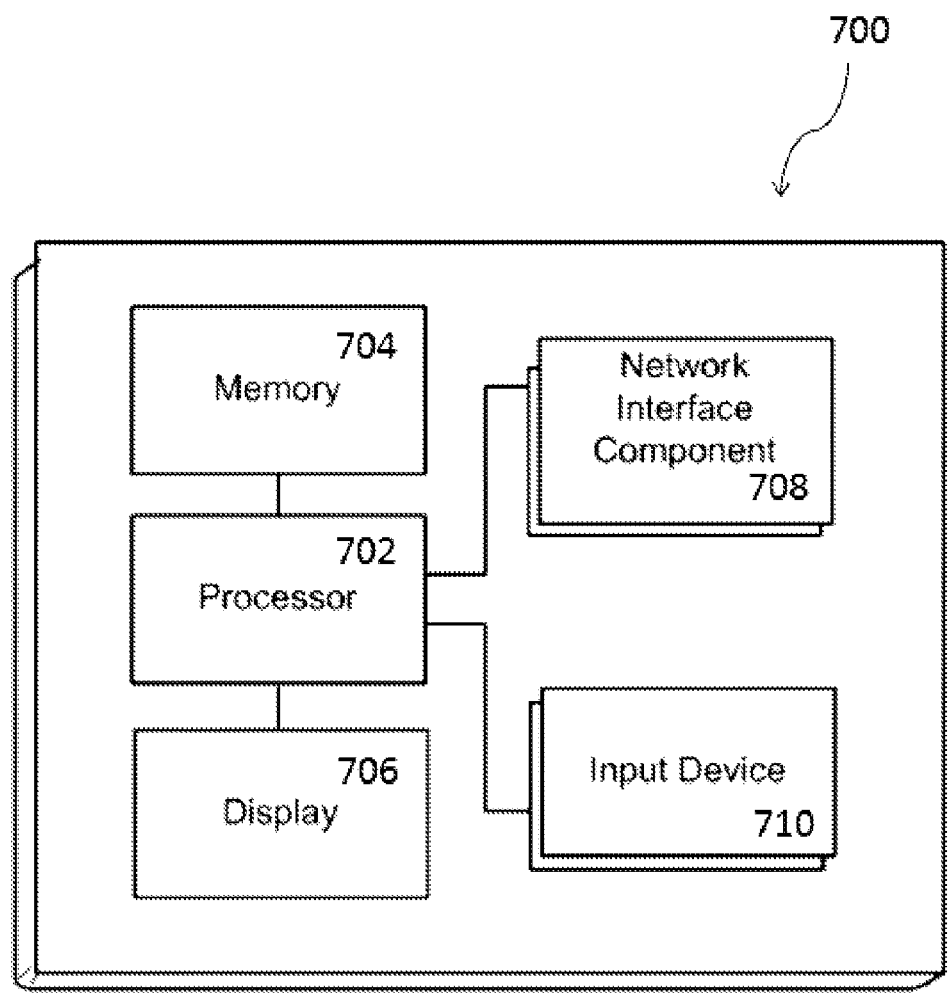
FIG. 7 is an exemplary computer system of an embodiment of the disclosure, in which the computer system obtains a security key from a key management server.

FIG. 7 illustrates a logical arrangement of a set of general components of an example computing device 700. In this example, the device includes a processor 702 for executing instructions that can be stored in a memory device 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, keyboard, mouse, keypad, or any other such device or element whereby a user can input a command to the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
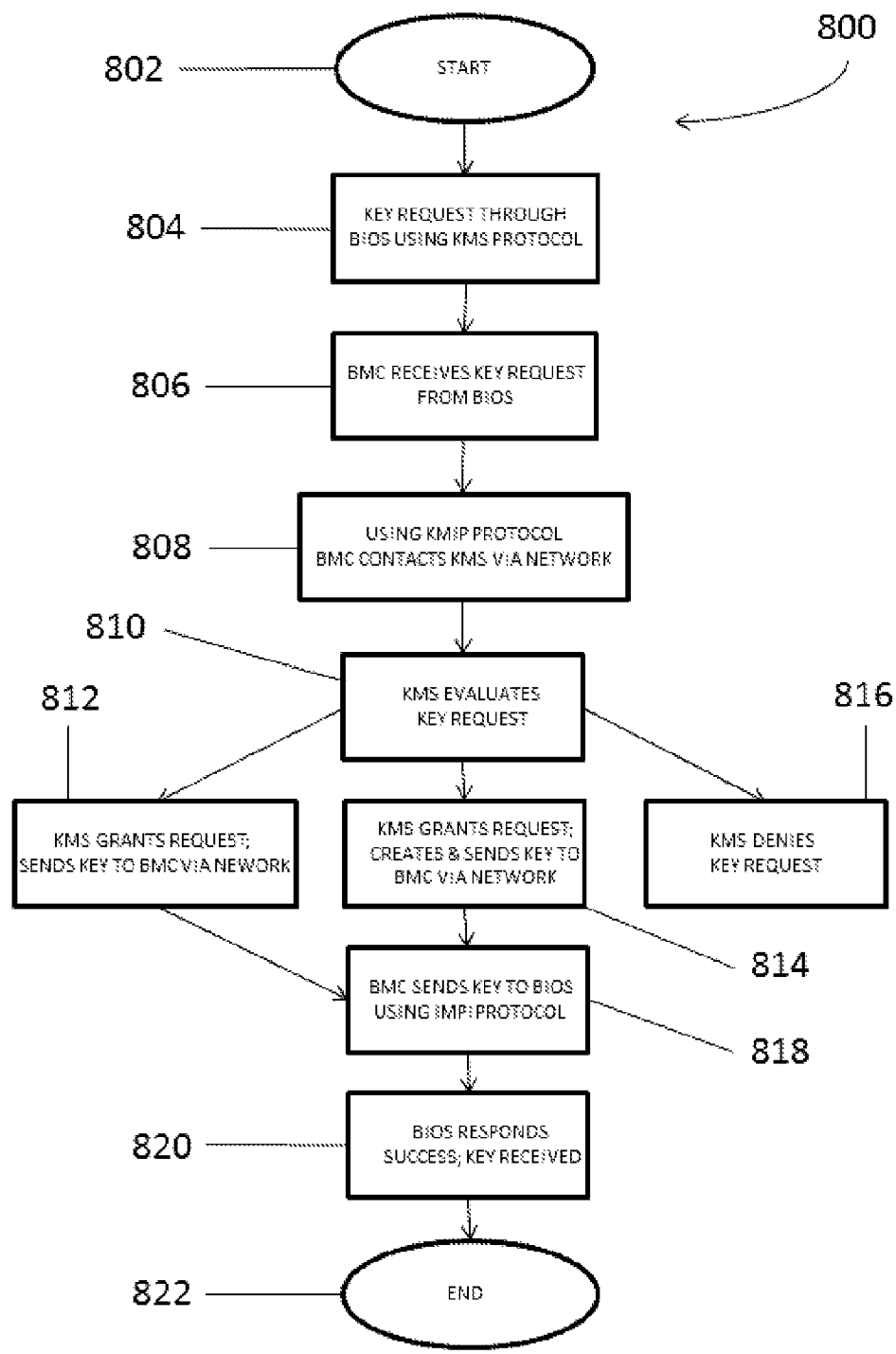
FIG. 8 is an exemplary diagram of an exemplary key management for a rack server system in accordance with an implementation of the present technology.

FIG. 8 illustrates a flow diagram of an exemplary key management for a rack server system 800 in accordance with an implementation of the present technology. The process starts at step 802, and in step 804 a key request is submitted via a BIOS of a computer system using a KMS protocol. The key request can be submitted by a variety of sources and devices, such as but not limited to a SED or a user interface. The BIOS sends the key request to the BMC in step 806. Using a KMIP protocol, the BMC contacts a KMS using a network in step 808. The KMS evaluates the key request in step 810. At least several outcomes are a result, including but not limited to step 812, where the KMS grants the security key request and sends the key back to the BMC via the network. In this step, the KMS has located an existing key and the key request has been validated. In step 814, an alternative outcome, the KMS determines that the key request is valid, but there is no existing key present in the KMS. As a result, the KMS creates a new key and sends the newly-created key back to the BMC via the network. In yet another outcome, in step 816, the KMS denies the key request. The key request denial by the KMS can be for a variety of reasons, such as but not limited to an unauthorized key request, an improper key request, or an invalid key request, such as due to the expiration of a time-limited security key. In step 818, the BMC sends the security key to the BIOS using IPMI protocol. In step 820, the BIOS responds that the security key has been successfully received from the KMS, and the process ends in step 822.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide methods for providing a backup power with an uninterruptible power system (UPS) that requires minimum standby power and has a high reliability. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present system and method can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to this technology can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the system and method as set forth in the claims.

The invention claimed is:

1. A system comprising:
   a processor;
   a baseboard management controller;
   a unified extensible firmware interface BIOS firmware; and
   a non-transitory computer-readable memory storing instructions which, when executed by the processor, causing the processor to perform operations prior to loading of an operating system (OS) of the system, comprising:

determining, via the unified extensible interface BIOS firmware, a status of a key management server;
determining that the key management server is operational based upon the status;
transmitting, via the unified extensible interface BIOS firmware, a command to the baseboard management controller to request a security key from the key management server;
requesting, by the baseboard management controller, the security key from the key management server;
receiving, by the baseboard management controller, the security key from the key management server; and
transmitting the security key from the baseboard management controller to the unified extensible interface BIOS firmware.

2. The system of claim 1, wherein the command to the baseboard management controller comprises a universally unique identifier.

3. The system of claim 1, wherein the unified extensible interface BIOS firmware polls the baseboard management controller to determine the status of the security key request.

4. The system of claim 3, wherein when the status of the security key request is successful, the unified extensible interface BIOS firmware, sends a command to the baseboard management controller to:
request the security key from the key management server;
obtain the security key; and
update the status of the security key.

5. The system of claim 3, wherein when the status of the security key request is unsuccessful, the unified extensible interface BIOS firmware initiates an error handler function.

6. The system of claim 1, wherein when the status indicates that the key management server is operational, transmitting, via the unified extensible interface BIOS firmware, a command to the baseboard management controller to request a new security key from the key management server.

7. A method of managing a security key for a rack server system, the method comprising steps comprising:
determining, via a unified extensible interface BIOS firmware, a status of a key management server;
determining that the key management server is operational based upon the status;
transmitting, via the unified extensible interface BIOS firmware, a command to a baseboard management controller of a server of the rack server system to request the security key from the key management server;
requesting, by the baseboard management controller, the security key from the key management server;
receiving, by the baseboard management controller, the security key from the key management server; and
transmitting the security key from the baseboard management controller to the unified extensible interface BIOS firmware,
wherein the steps are prior to loading of an operating system (OS) of the server.

8. The method of claim 7, wherein the command to the baseboard management controller is secured using a universally unique identifier.

9. The method of claim 8, further comprising: polling, by the unified extensible interface BIOS firmware, the baseboard management controller to determine the status of the security key request.

10. The method of claim 9, wherein, when the status of the security key request is successful, further comprising:
sending a command by the unified extensible interface BIOS firmware to the baseboard management controller;
requesting the security key from the key management server;
obtaining the security key; and
updating the status of the security key.

11. The method of claim 9, wherein when the security key does not exist, sending a command to the baseboard management controller to request a new security key from the key management server.

12. The method of claim 9, wherein when the security key does not exist:
requesting identifying information from a security key requestor;
determining whether the security key requestor is authorized to receive the security key;
creating the security key when the security key requestor is authorized to receive the security key;
transmitting the security key to the baseboard management controller;
or
denying the security key requestor if the requestor is not authorized to receive the security key.

13. A method of managing a security key for a rack server system, the method comprising steps comprising:
requesting the security key through a unified extensible interface BIOS firmware;
sending the security key request to a baseboard management controller of a server of the rack server system;
causing the baseboard management controller to communicate to a key management server;
causing the baseboard management controller to determine (a) whether the security key request is valid and (b) whether the security key is available;
causing the key management server to send, in response to the determining, the security key to the baseboard management controller via the network when the security key request is valid and available; and
receiving, by the unified extensible interface BIOS firmware, the security key from the baseboard management controller,
wherein the steps are prior to loading of an operating system (OS) of the server.

14. The method of claim 13, wherein when the security key does not exist, the baseboard management controller can cause the key management server to perform the steps of:
requesting identifying information from a security key requestor;
determining whether the security key requestor is authorized to receive the security key;
creating the security key when the security key requestor is authorized to receive the security key; and
transmitting the security key to the baseboard management controller;
or
denying the security key requestor if the requestor is not authorized to receive the security key.

15. The method of claim 14, wherein when the security key does not exist and the security key requestor is not authorized to receive the security key:
denying the security key to the security key requestor; and
providing a message to the security key requestor that the security key request is denied.

16. The method of claim 13, wherein when the security key request is valid but the security key is not available:

providing a message to the security key requestor that the security key request is valid and the security key is not available.

17. The method of claim 13, wherein when the security key request is invalid but the security key is available:
providing a message to the security key requestor that the security key request is invalid and the security key is available.

18. The method of claim 13, wherein the security key is requested and/or transmitted using a text-based communication service.

19. The method of claim 13, wherein the unified extensible interface BIOS firmware polls the baseboard management controller to determine the status of the security key request.

20. The method of claim 19, wherein when the status of the security key request is unsuccessful, the unified extensible interface BIOS firmware initiates an error handler function.

* * * * *